(12) United States Patent
Ham

(10) Patent No.: US 7,515,234 B2
(45) Date of Patent: Apr. 7, 2009

(54) ALIGNMENT METHOD USING ION BEAM IRRADIATION

(75) Inventor: Yong Sung Ham, Anyang-shi (KR)

(73) Assignee: LG Display Co., Ltd., Seoul (KR)

( * ) Notice: Subject to any disclaimer, the term of this patent is extended or adjusted under 35 U.S.C. 154(b) by 178 days.

(21) Appl. No.: 11/134,279

(22) Filed: May 23, 2005

(65) Prior Publication Data
US 2005/0259204 A1 Nov. 24, 2005

(30) Foreign Application Priority Data
May 24, 2004 (KR) .................. 10-2004-0036795

(51) Int. Cl.
*G02F 1/1337* (2006.01)
(52) U.S. Cl. .................... 349/124; 349/125
(58) Field of Classification Search .......... 250/491, 250/492; 349/124, 125
See application file for complete search history.

(56) References Cited

U.S. PATENT DOCUMENTS

| | | | |
|---|---|---|---|
| 5,268,781 A * | 12/1993 | Shigeta et al. | 349/125 |
| 5,770,826 A * | 6/1998 | Chaudhari et al. | 204/157.15 |
| 6,020,946 A * | 2/2000 | Callegari et al. | 349/124 |
| 6,061,114 A * | 5/2000 | Callegari et al. | 349/125 |
| 6,210,748 B1 * | 4/2001 | Nagahara et al. | 427/108 |
| 6,632,483 B1 * | 10/2003 | Callegari et al. | 427/526 |
| 6,967,340 B2 * | 11/2005 | Lee et al. | 250/492.21 |
| 2002/0001057 A1 * | 1/2002 | Chaudhari et al. | 349/124 |
| 2004/0247798 A1 * | 12/2004 | Ham et al. | 427/551 |
| 2005/0259204 A1 * | 11/2005 | Ham | 349/124 |
| 2007/0148988 A1 * | 6/2007 | Chen et al. | 438/778 |
| 2008/0030672 A1 * | 2/2008 | Lee et al. | 349/191 |

FOREIGN PATENT DOCUMENTS

| | | |
|---|---|---|
| JP | 2004-037875 | 2/2004 |
| KR | 1999-007216 | 1/1999 |

* cited by examiner

*Primary Examiner*—Mike Qi
(74) *Attorney, Agent, or Firm*—McKenna Long & Aldridge LLP

(57) ABSTRACT

Provided is an alignment method including: forming an alignment film on a substrate; irradiating an ion beam onto the alignment film using a bar-type ion gun; and cleaning a surface of the substrate having the alignment film. The irradiating of an ion beam satisfies the following equation: $1.6 \times 10^{-4} \leq (L_g \times I \times T)/L_s \leq 1.6 \times 10^{-2}$, where I is an ion beam current (A) measured outside an ion beam outlet and irradiated from the bar-type ion gun, Lg is a length (cm) of the ion beam outlet with respect to a moving direction of the substrate, Ls is a length (cm) of the substrate in the moving direction of the substrate, and T is a process time (sec) for processing one substrate.

5 Claims, 6 Drawing Sheets

ALIGNMENT METHOD USING ION BEAM IRRADIATION

This application claims the benefit of the Korean Application No. P2004-36795, filed on May 24, 2004, which is hereby incorporated by reference for all purposes as if fully set forth herein.

BACKGROUND OF THE INVENTION

1. Field of the Invention

The present invention relates to an alignment process of an alignment film for a liquid crystal display device, and more particularly, to an alignment method in which an ion beam is irradiated onto an alignment film using a bar-type ion beam gun.

2. Discussion of the Related Art

As new and modern image displays such as high definition televisions (TV) are developed, researches on flat panel displays, such as liquid crystal display devices (LCDs), electro luminescence displays (ELDs), vacuum fluorescence displays (VFDs), plasma display panels (PDPs) and the like, are actively being conducted.

LCDs are a representative display of these flat panel displays, which have such features as slim profile, low price, low power consumption, etc., and extend applications to vehicle monitors and color TVs as well as laptop computers and pocket computers.

An LCD has a structure in which an upper color filter substrate and a lower thin film transistor (TFT) substrate are disposed facing each other and a liquid crystal layer having a dielectric anisotropy is interposed between the upper color filter substrate and the lower TFT substrate. The LCD operates by switching thin film transistors (TFTs) electrically connected to several hundred thousand pixels to apply voltages to corresponding pixels through pixel selection address lines.

A method of fabricating the LCD includes a transistor process, a color filter process, a liquid crystal (LC) cell process and a module process.

The transistor process is used for forming a TFT array on a glass substrate by repeatedly performing deposition, photolithography and etching operations. The color filter process is used for forming a color filter layer including red (R), green (G) and blue (B) color filters on a glass substrate including a black matrix layer thereon using dye or pigment, and for forming an ITO film serving as a common electrode.

The LC cell process is used for attaching a glass substrate where the transistor process is completed and a glass substrate where the color filter process is completed such that a space is formed between the two glass substrates, and injecting liquid crystal into the space to form an LC cell. The module process is used for forming a circuit part for signal processing, for connecting the circuit part with a TFT-LCD panel using a mounting technique, and for assembling the TFT-LCD panel and the circuit part with structural elements to fabricate an LCD module.

In more detail, the LC cell process includes aligning an alignment film, attaching the two substrates, and injecting liquid crystal. The alignment step includes cleaning the substrates, coating an alignment film, hardening the alignment film, rubbing the alignment film, cleaning the alignment film and the like.

The alignment step will now be described with reference to the accompanying drawings. FIG. 1 is a flow diagram illustrating an alignment method according to the related art, and FIG. 2 is a cross-sectional view illustrating a rubbing method according to the related art.

Referring to FIG. 1, a substrate cleaning step S100 is first performed to remove foreign particles from an upper substrate or a lower substrate. The substrate cleaning step S100 is performed by spraying deionized water onto an upper surface of the substrate through a nozzle to remove water-soluble impurities from the upper surface of the substrate, or is performed using a cleaning apparatus provided with a UV processing part to remove organic impurities.

Next, in an alignment film printing step S101, a raw material for an alignment film is printed on an effective display area of the upper surface of the substrate to a predetermined thickness by a spin-coating method or a roll-coating method.

Next, in a pre-baking step S102, heat is applied to the raw material to volatize the solvent contained in the raw material. When the solvent of the raw material is volatized, a pretilt angle appears on an upper surface of the printed raw material and dust is prevented from being adhered on the printed raw material during the subsequent steps.

An alignment film hardening step S103 is subsequently performed, in which the printed raw material is heated in a temperature range of 80 to 200° C., which is higher than a temperature range employed in the pre-baking step S102, so that the printed raw material is hardened.

Next, an alignment film rubbing step S104 is performed using a rubbing roll 30 having grooves engraved at a constant interval, as illustrated in FIG. 2. In the alignment film rubbing step S104, the upper surface of the alignment film printed on a substrate 15 is rubbed in a selected direction to form grooves. The rubbing step S104 is performed by moving the substrate 15 loaded on a transfer plate 31 or the rubbing roll 30 in a selected direction.

Lastly, an alignment film cleaning step S105 is performed so as to remove foreign particles that may exist on the substrate having the alignment film thereon. With the alignment film cleaning step S105, the alignment process is completed.

As described above, the rubbing method illustrated in FIG. 2 is generally employed to align an alignment film according to the related art TFT-LCD. In the rubbing method, an alignment film 10 is coated on the substrate 15, the substrate 15 is loaded on the transfer plate 31, and the alignment film coated on the substrate 15 is rubbed in a selected direction using the roller 30 wound with cloth such as velvet to align the alignment film 10.

However, the rubbing method according to the related art requires a direct contact between the alignment film and the roller, causing various problems such as contamination due to generation of particles, a device failure due to generation of static electricity, necessitating a cleaning/drying process after the rubbing process, non-uniformity in large-sized application, or the like.

To address these problems associated with the related art rubbing method, a variety of alignment methods have been suggested, such as a method using an LB film, a method using UV illumination, a method using oblique evaporation of $SiO_2$, a method using micro-groove, and a method using an ion beam.

The alignment method using an ion beam can use a conventional alignment material (the same type of material disclosed in the related art) without any change and can be used for a large-sized panel, according to U.S. Pat. No. 5,770,826.

More specifically, the alignment method using an ion beam uses an ion beam having a low energy in which the ion beam bombards the surface of an alignment film, for example, a polyimide film, so that the surface of the alignment film has a directionality. This alignment method is advantageous in that an alignment pattern can be formed without any direct contact with the alignment film at a low energy. In addition, because the ion beam only influences the chemical bonds on a surface of the alignment film, the number of radicals that are formed when chemical bonds are broken can be minimized, and a uniform alignment pattern can be obtained.

The alignment method using an ion beam will now be described in detail. FIG. 3 is a schematic view illustrating ion beam irradiation equipment according to the related art, and FIG. 4 is a graph showing a relationship between an irradiation angle of ion beam and a pretilt angle.

Referring to FIG. 3, an ion beam irradiation part 2 ionizes a gas supplied from a gas supply part 1 into ions and irradiates the ions (ion beam) onto a substrate 4. The ion beam treatment is performed inside a process chamber 8. The process chamber 8 further includes a gas discharge part 9 disposed at a side of the process chamber 8 for discharging gas remaining after the ionization, and a support bar 7 for supporting a substrate 3. To adjust the projection time, the ion beam irradiation equipment may include a shutter 4 between the ion beam irradiation part 2 and the substrate 3.

To form a pretilt angle on an alignment film, an ion beam is irradiated while the substrate 3 is positioned oblique to an irradiation direction of the ion beam at a predetermined angle. Assuming that an angle between an irradiation direction of the ion beam and a direction perpendicular to the substrate 3 is 'θ', a relationship between the angle 'θ' and the pretilt angle is shown in the graph of FIG. 4. In other words, as shown in FIG. 4, the pretilt angle varies depending on the angle 'θ', which indicates that a desired pretilt angle can be obtained by irradiating the ion beam on the substrate at a particular angle.

However, the alignment method using an ion beam according to the related art has the following drawbacks. That is, because the ion beam is irradiated while the substrate is positioned oblique at an angle, as illustrated in FIG. 3, it is required to maintain a sufficient distance between a point where the ion beam starts to propagate and the substrate to irradiate the ion beam of uniform energy onto the substrate. In addition, as the size of the substrate increases, the distance should also increase to maintain the uniformity, thereby increasing the size of the equipment. Thus, as the size of the equipment increases, the fabrication costs increase, the fabrication process becomes complicated, and the production yield decreases.

SUMMARY OF THE INVENTION

Accordingly, the present invention is directed to an alignment method using ion beam that substantially obviates one or more problems due to limitations and disadvantages of the related art.

An advantage of the present invention is to provide an alignment method capable of a uniform irradiation by irradiating an ion beam at a constant angle using a bar-type ion gun.

Another advantage of the present invention is to propose a relational equation showing a relationship among substrate size, process time, ion beam dose and size of ion beam outlet for securing basic alignment characteristics when a bar-type ion gun is used.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, an alignment method includes: forming an alignment film on a substrate; irradiating an ion beam onto the alignment film using a bar-type ion gun; and cleaning a surface of the substrate having the alignment film.

In particular, when the alignment treatment is performed using the bar-type ion gun while moving the substrate in one direction, conditions relating to a substrate size, a process time, an ion beam dose and an ion beam outlet size satisfy the following equation:

$$1.6 \times 10^{-4} \leq (Lg \times I \times T)/Ls \leq 1.6 \times 10^{-2},$$

where I is an ion beam current (A) measured outside an ion beam outlet and irradiated from the bar-type ion gun, Lg is a length (cm) of the ion beam outlet with respect to a moving direction of the substrate, Ls is a length (cm) of the substrate in the moving direction of the substrate, and T is a process time (sec) for processing one substrate.

The above equation is suitable for ion beam equipment provided with one ion gun. When ion beam equipment provided with a plurality of ion guns is used, the above equation should be modified as disclosed in the specification.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
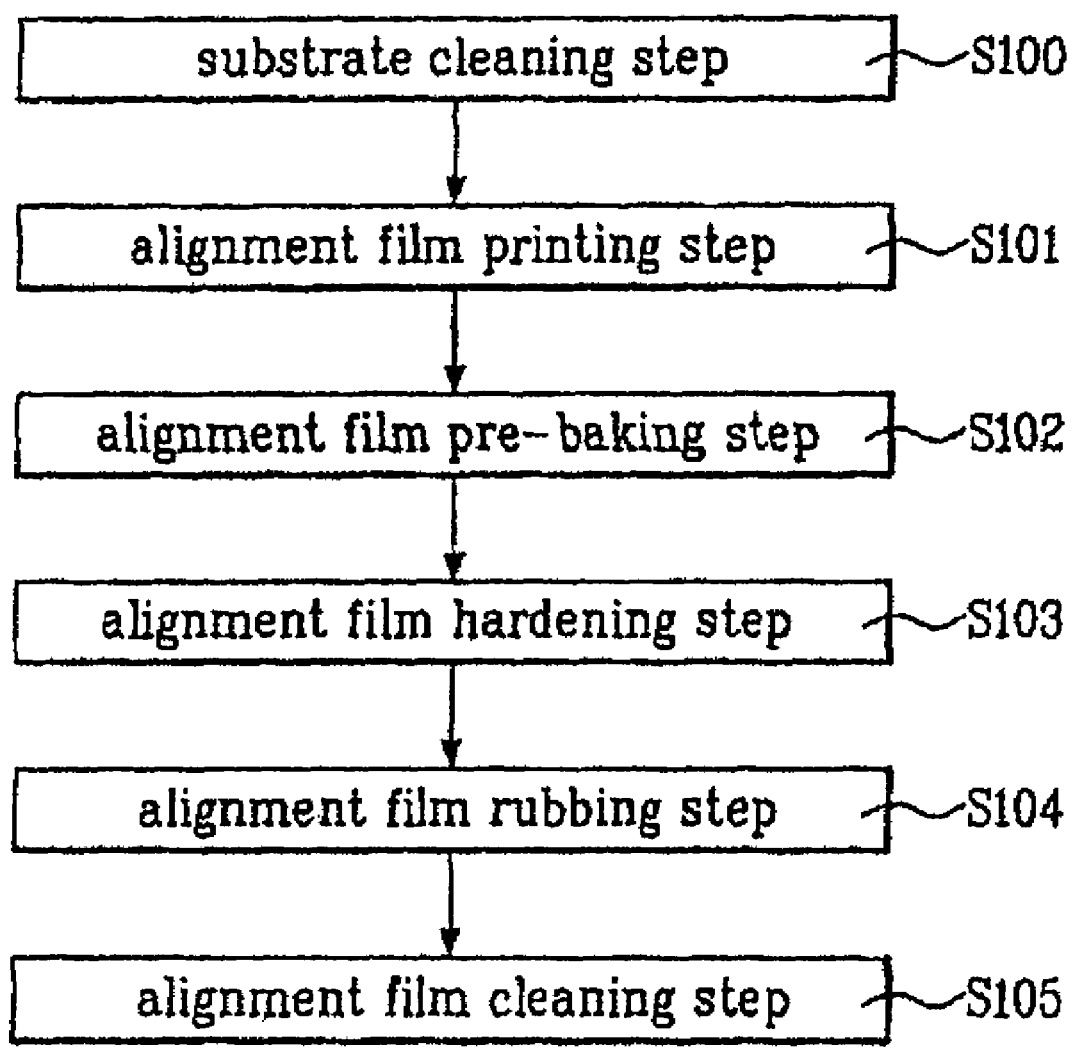
FIG. 1 is a flow diagram illustrating an alignment method according to the related art.
Figure 2:
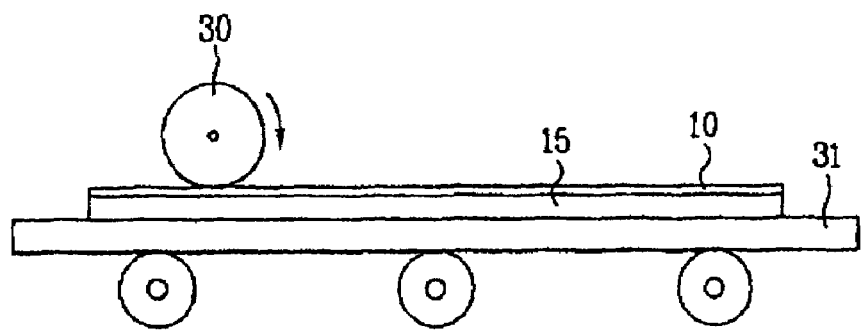
FIG. 2 is a cross-sectional view illustrating a rubbing method according to the related art.
Figure 3:
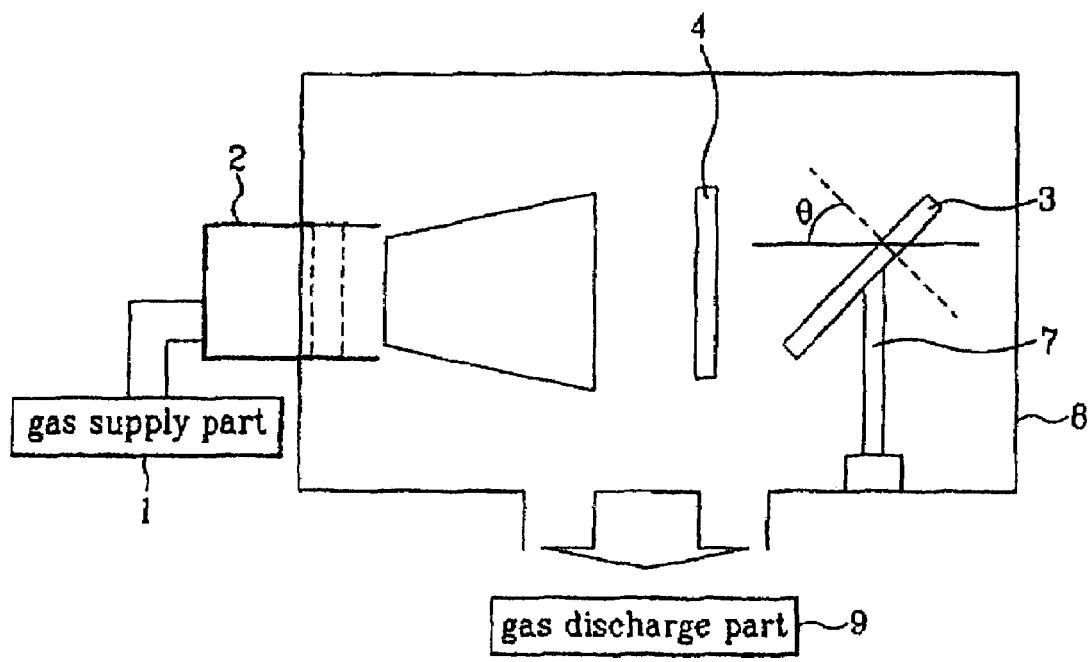
FIG. 3 is a schematic view illustrating an ion beam irradiation equipment according to the related art.
Figure 4:
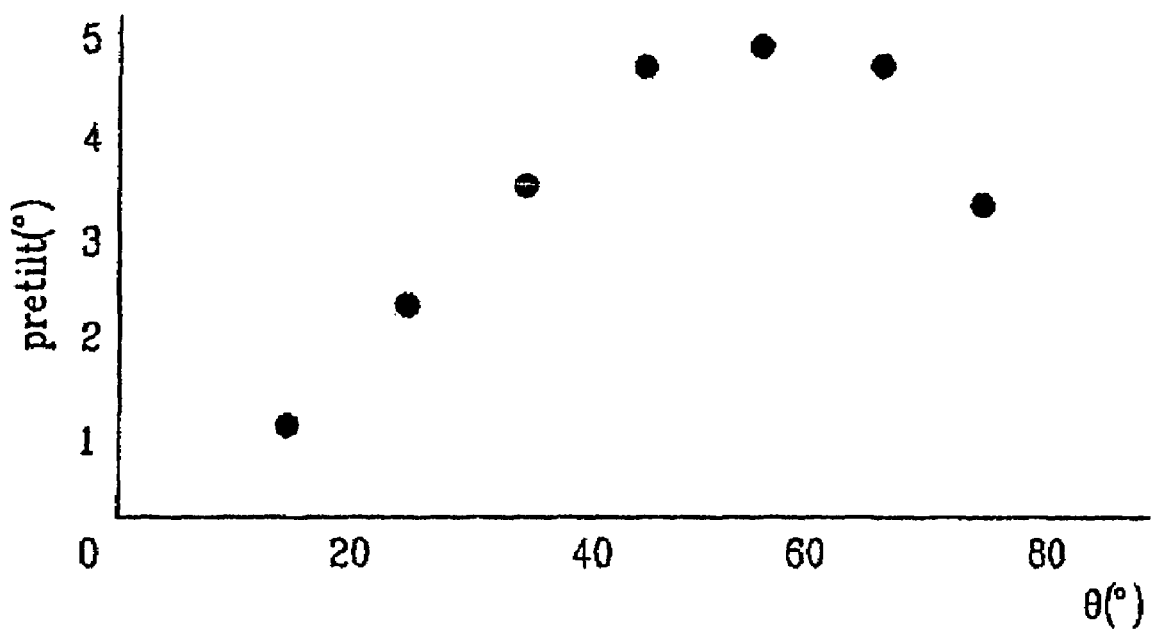
FIG. 4 is a graph showing a relationship between an irradiation angle of ion beam and a pretilt angle.
Figure 5:
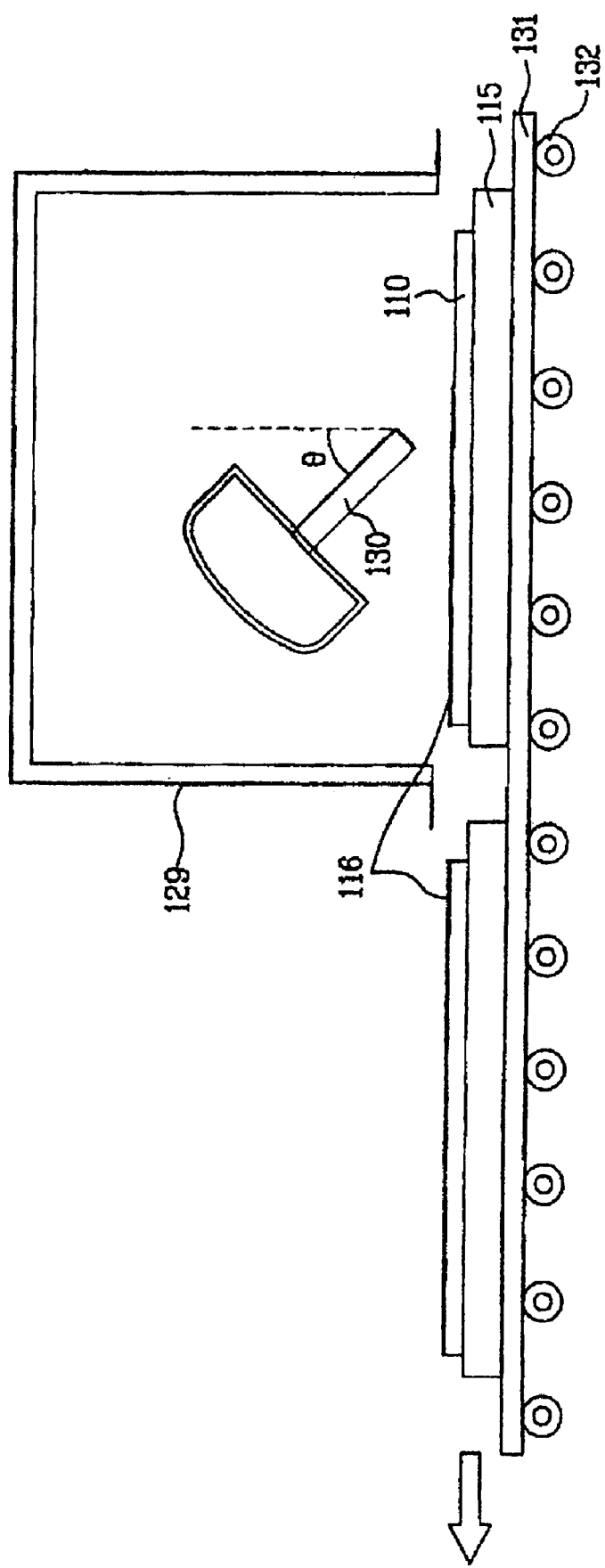
FIG. 5 is a cross-sectional view illustrating an alignment method using an ion beam according to the present invention.
Figure 6:
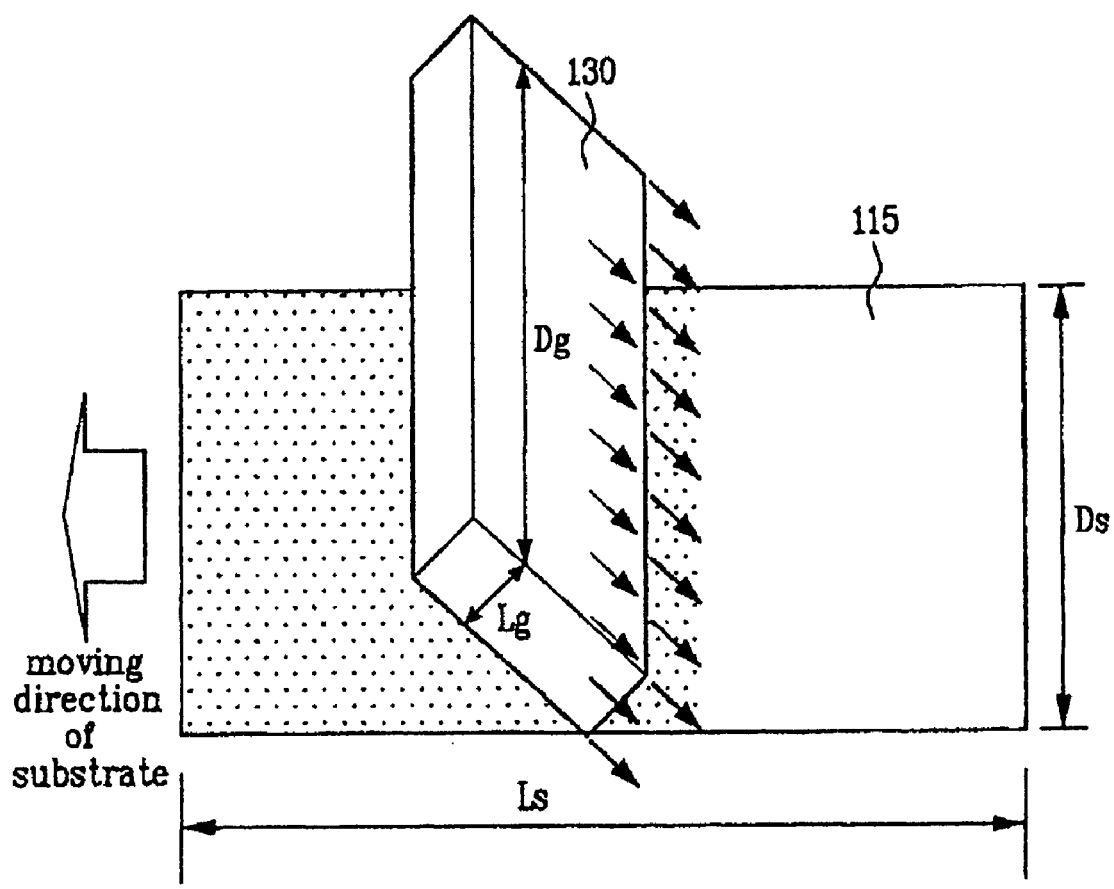
FIG. 6 is a perspective view illustrating an alignment method according to a first embodiment of the present invention.
Figure 7:
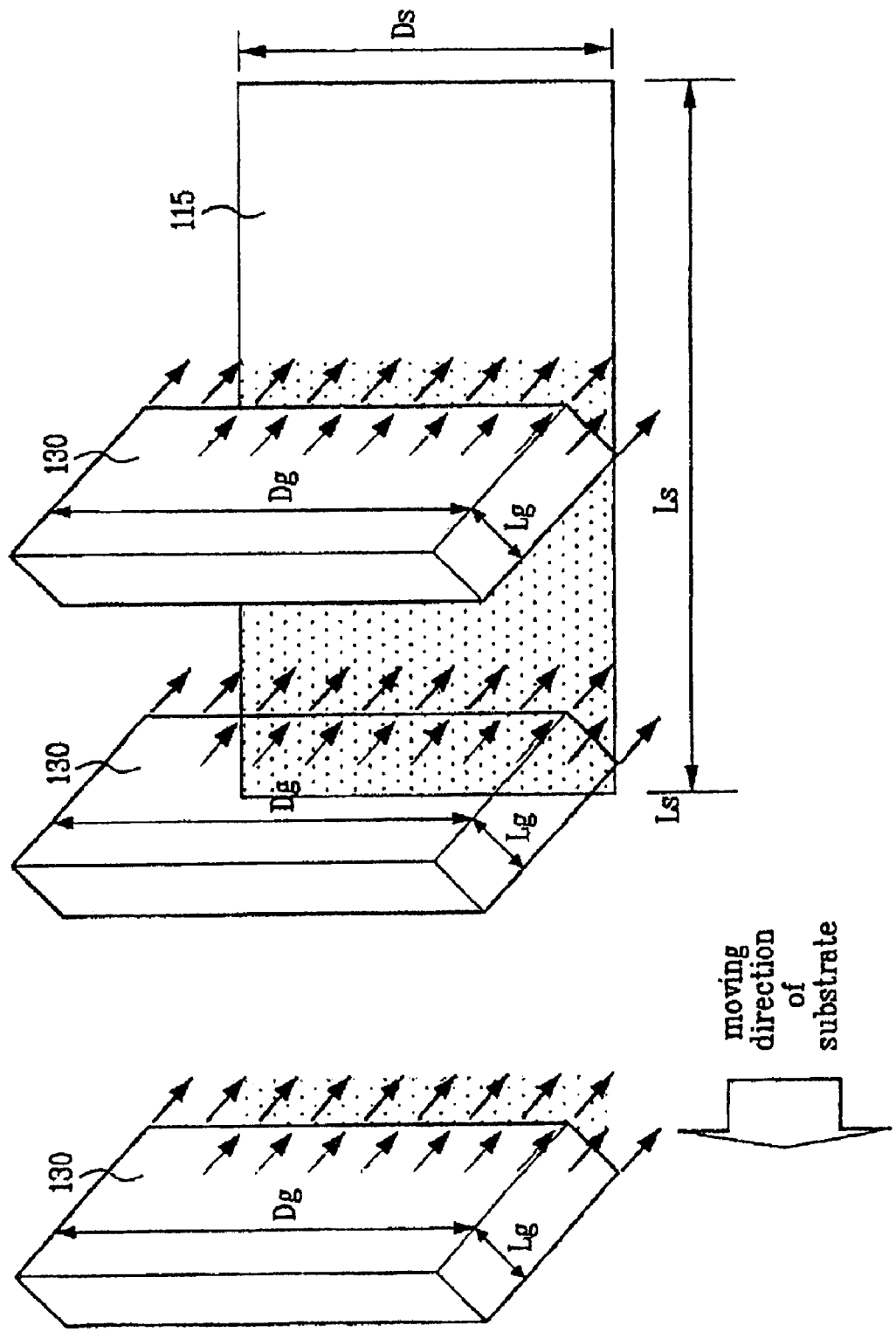
FIG. 7 is a perspective view illustrating an alignment method according to a second embodiment of the present invention.

FIG. 5 is a cross-sectional view illustrating an alignment method using an ion beam according to the present invention, FIG. 6 is a perspective view illustrating an alignment method according to a first embodiment of the present invention, and FIG. 7 is a perspective view illustrating an alignment method according to a second embodiment of the present invention.

In the alignment method using an ion beam according to the present invention, a substrate cleaning process is performed to remove foreign particles from an upper surface of a substrate. As aforementioned, cleaning equipment may include a deionized water shower for removing soluble impurities and a UV processing part for removing organic impurities.

The substrate can be either a color filter array substrate including a color filter layer and a common electrode formed thereon, or a TFT array substrate including TFTs and pixel electrodes formed on respective pixel regions defined by a plurality of gate lines and a plurality of data lines.

Next, a raw material for an alignment film is printed on an effective display area of an upper surface of the substrate to a predetermined thickness using a printing unit. Then, dry and hardening processes are performed to volatize the solvent contained in the raw material and to realize a pretilt angle.

Thereafter, the surface of the hardened alignment film is subject to an alignment treatment. That is, an ion beam is irradiated onto the surface of the hardened alignment film as the substrate having the alignment film moves in a predetermined direction. At this time, the ion beam may have a constant current level and the ion gun may move instead of the substrate.

More specifically, the substrate 115 having the hardened alignment film formed thereon is loaded on a transfer plate 131, and a transfer roller 132 moves the transfer plate in a desired direction, as illustrated in FIG. 5. A bar-type ion gun 130 irradiates an ion beam onto the moving substrate at an oblique angle of 'θ', thereby forming a pretilt angle on a upper surface of the alignment film. The bar-type ion gun 130 is installed in a chamber 129 for providing ions.

The process conditions for the ion gun 130 should be adjusted according to the size of the substrate and process time. In doing so, four factors should be considered, i.e., ion beam dose, size of the substrate, size of the area through which the ion beam is irradiated, and process time for processing one substrate. These four factors should be properly adjusted to secure basic alignment characteristics in performing an alignment treatment according to the present invention.

Hereinafter, these four factors will be described in more detail in consideration of the basic alignment characteristics. The basic alignment characteristics indicate stable alignment and non-rupture of a surface of the alignment film.

First, an ion beam dose according to the present invention should be in a range of about $1.0 \times 10^{15}$ to $1.0 \times 10^{17}$ (EA/cm$^2$) to satisfy the stable alignment and non-rupture conditions. This is because if the ion beam dose is below $1.0 \times 10^{15}$ (EA/cm$^2$), the stable alignment may not be obtained, while if the ion beam dose is above $1.0 \times 10^{17}$ (EA/cm$^2$), the surface of the alignment film is ruptured. This condition should be satisfied regardless of irradiation methods. Thus, this ion beam dose condition should be maintained in an alignment method according to the present invention in which a bar-type ion gun is used and a substrate having an alignment film moves.

Next, conditions relating to irradiation equipment for satisfying the basic alignment characteristics will be described with reference to FIG. 6 and the following Equation 1:

$$1.6 \times 10^{-4} \leq (Lg \times I \times T)/Ls \leq 1.6 \times 10^{-2} \quad \text{[Equation 1]}$$

where I is an ion beam current (A) measured outside an ion beam outlet and irradiated from the bar-type ion gun, Lg is a length (cm) of the ion beam outlet with respect to a moving direction of the substrate, Ls is a length (cm) of the substrate in the moving direction of the substrate, and T is a process time (sec) for processing one substrate.

The ion beam current for securing the basic alignment characteristics can be obtained by assigning the corresponding values to Lg, Ls and T.

Equation 1 can be induced as follows. First, the number of all ions irradiated from the ion gun during a process time set for one substrate is computed. In other words, assuming that the ion beam is continuously irradiated from the ion gun during the process of one substrate, ion beam current per unit area is I (C/cm$^2$·sec), and charge of each ion is $1.6 \times 10^{-19}$(C), then the number of all ions irradiated from the ion gun is $I/(1.6 \times 10^{-19}) = I \times 6.25 \times 10^{18}$ (EA/cm$^2$·sec).

Because the area of the irradiation outlet is Lg×Dg (cm$^2$), the total number of ions Ng (EA) irradiated from the ion gun during the process of one substrate can be expressed as Equation 2:

$$Ng = I \times T \times Lg \times Dg \times 6.25 \times 10^{18} (EA) \quad \text{[Equation 2]}$$

where Dg is a length (cm) of the ion beam outlet perpendicular to the moving direction of the substrate.

Next, a total number of ions necessary for a given substrate to secure the basic alignment characteristics should be set. As aforementioned, the ion beam dose per unit area should be in a range of $1.0 \times 10^{15}$ to $1.0 \times 10^{17}$ (EA/cm$^2$). Since the substrate area is Ls×Ds (cm$^2$), the total number of ions Ns (EA) necessary for the substrate to secure the basic alignment characteristic should satisfy the following Equation 3:

$$Ls \times Ds \times 1.0 \times 10^{15} (EA) \leq Ns \leq Ls \times Ds \times 1.0 \times 10^{17} (EA) \quad \text{[Equation 3]}$$

where Ds is a length (cm) of the substrate perpendicular to the moving direction of the substrate.

Thus, Equation 1 is obtained under an assumption that the total number of ions irradiated from the ion gun is equal to the total number of ions that the substrate receives from the results of Equations 2 and 3.

In other words, since Ng of Equation 2 should be equal to Ns of Equation 3, Ns of Equation 3 is substituted with Ng of Equation 2. At this time, since Dg is equal to Ds, Dg can be substituted with Ds. By doing so, Equation 1 is induced as follows:

$$Ls \times Ds \times 1.0 \times 10^{15} \leq I \times T \times Lg \times Dg \times 6.25 \times 10^{18} \leq Ls \times Ds \times 1.0 \times 10^{17}$$

$$Ls \times Ds \times 1.0 \times 10^{15} \leq I \times T \times Lg \times Ds \times 6.25 \times 10^{18} \leq Ls \times Ds \times 1.0 \times 10^{17}$$

$$1.6 \times 10^{-4} \leq (Lg \times I \times T)/Ls \leq 1.6 \times 10^{-2} \quad \text{[Equation 1]}$$

Thus, an ion beam irradiation method for aligning an alignment film according the first embodiment must satisfy Equation 1 with respect to parameters including ion beam current (I) irradiated from the ion gun, length (Lg) of the ion beam outlet with respect to a moving direction of the substrate, length (Ls) of the substrate in the moving direction of the substrate, and process time (T) for processing one substrate.

In another embodiment, an alignment treatment may be performed using a plurality (n-number) of ion guns. In other words, n-number of ion guns 130 are used for shortening the alignment treatment time for one substrate, as illustrated in FIG. 7. Although the conditions relating to irradiation equipment may be changed as disclosed below, the same inducing method as in the case of a single ion gun can be used.

First, when n-number of ion guns have the same ion beam current, the following Equation 4 can be used.

$$1.6 \times 10^{-4} \leq (Lg \times nI' \times T)/Ls \leq 1.6 \times 10^{-2} \quad \text{[Equation 4]}$$

where I' is an ion beam current (A) of each ion beam gun, and T' is a process time (sec) for processing one substrate.

Alternatively, when n-number of ion guns have different ion beam currents, the following Equation 5 can be used:

$$1.6 \times 10^{-4} \leq (Lg \times \Sigma Ik \times T')/Ls \leq 1.6 \times 10^{-2} \quad \text{[Equation 5]}$$

where Ik is an ion beam current (A) of k-th ion beam gun, $\Sigma Ik$ is a sum of ion beam currents of n-number of ion guns, and T' is a process time (sec) for processing one substrate.

The conditions using the bar-type ion beam gun(s) are set by Equations 1, 4 and 5, and then an alignment treatment is performed.

After the alignment process is performed, an alignment film cleaning process is performed to remove foreign particles from a surface of the substrate, thereby completing the alignment treatment.

Although the above embodiments are described with a bar-type ion gun, it should be appreciated that a different type of ion gun, such as a circular type ion gun, can be applied, and that the substrate can move in a twisted state by a predetermined angle with respect to the bar-type ion gun.

As described above, an alignment method using ion beam according to the present invention has the following advantages. First, the alignment treatment using a bar-type ion gun can secure the basic alignment characteristics by controlling substrate size, process time, ion beam dose and size of ion beam outlet according to the relational equations disclosed above. Second, a bar-type ion gun is used to uniformly irradiate ion beam at a constant angle, so that it is not necessary to secure a long distance between a point where ion beam starts to propagate and the substrate, and thus an alignment method according to the present invention does not require large-sized equipment.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An alignment method, comprising:
    forming an alignment film on a substrate;
    irradiating an ion beam onto the alignment film at an oblique angle using a bar-type ion gun, as one of the bar-type ion gun and the substrate moves in a predetermined direction; and
    cleaning a surface of the substrate having the alignment film;
    wherein irradiating the ion beam satisfies the following equation:

$$1.6 \times 10^{-4} \leq (Lg \times I \times T)/Ls \leq 1.6 \times 10^{-2},$$

where I is an ion beam current (A) measured outside an ion beam outlet and irradiated from the bar-type ion gun, Lg is a length (cm) of the ion beam outlet with respect to a moving direction of the substrate, Ls is a length (cm) of the substrate in the moving direction of the substrate, and T is a process time (sec) for processing one substrate.

2. The method of claim 1, wherein the ion beam is irradiated at a dose range of about $1.0 \times 10^{15}$ to $1.0 \times 10^{17}$ EA/cm2.

3. A method of fabricating a liquid crystal display, comprising:
    preparing first and second substrates;
    forming an alignment film on a first substrate;
    irradiating an ion beam onto the alignment film at an oblique angle using an ion gun, as one of the ion gun and the first substrate moves in a predetermined direction;
    attaching the first and second substrates; and
    providing a liquid crystal layer between the first and second substrates
    wherein at least two ion guns are used during the irradiation and the ion guns irradiate different ion beam currents;
    wherein the ion guns satisfy the following equation:

$$1.6 \times 10^{-4} \leq (Lg \times \Sigma Ik \times T')/Ls \leq 1.6 \times 10^{-2},$$

where Ik is an ion beam current (A) of k-th ion gun, $\Sigma Ik$ is a sum of ion beam currents of n-number of ion guns to process one substrate, T' is a process time (sec) for processing one substrate, Lg is a length (cm) of the ion beam outlet with respect to a moving direction of the substrate, and Ls is a length (cm) of the substrate in the moving direction of the substrate.

4. The method of claim 3, wherein the ion gun is either a bar-type ion gun or a circular type ion gun.

5. The method of claim 4, wherein the ion beam is irradiated at a dose range of about $1.0 \times 10^{15}$ to $1.0 \times 10^{17}$ EA/cm2.

* * * * *